United States Patent [19]
Hill

[11] 3,731,483
[45] May 8, 1973

[54] FREE POWER GAS TURBINE ENGINE WITH AERODYNAMIC TORQUE CONVERTER DRIVE

[75] Inventor: Charles C. Hill, La Jolla, Calif.

[73] Assignee: Power Technology Corporation, Bloomfield Hills, Mich.

[22] Filed: Dec. 29, 1971

[21] Appl. No.: 213,437

[52] U.S. Cl. ........60/39.16 R, 60/39.18 C, 60/39.24, 74/720
[51] Int. Cl. ................................F02c 7/02
[58] Field of Search..................60/39.16, 39.24, 60/39.18 C; 74/720

[56] References Cited

UNITED STATES PATENTS

| | | | |
|---|---|---|---|
| 3,314,232 | 4/1967 | Hill | 60/39.24 |
| 3,587,766 | 6/1971 | Slade | 60/39.18 C |
| 2,374,510 | 4/1945 | Traupel | 60/39.18 C |
| 3,626,692 | 12/1971 | Kumm | 60/39.16 R |
| 3,043,162 | 7/1962 | Kugel et al. | 74/720 |
| 2,949,793 | 8/1960 | Suri | 74/720 |
| 3,659,417 | 5/1972 | Grieb | 60/39.18 C |
| 2,793,019 | 5/1957 | Baumann | 60/39.18 C |

Primary Examiner—Carlton R. Croyle
Assistant Examiner—Warren Olsen
Attorney—Barnes, Kisselle, Raish & Choate

[57] ABSTRACT

A gas turbine engine including a first turbine stage and a second turbine stage, the first turbine stage being connected directly to the compressor and the second turbine stage being unconnected thereto, combined with an aerodynamic torque converter. The aerodynamic torque converter has an input shaft connected to the second stage of the turbine and an output shaft which can be selectively connected to the second stage of the turbine to provide for drive thru the aerodynamic torque converter or through the turbine and bypassing the aerodynamic torque converter.

4 Claims, 2 Drawing Figures

Patented May 8, 1973

3,731,483

INVENTOR.
CHARLES C. HILL
BY
Barnes, Kisselle, Raisch & Choate
ATTORNEYS

FREE POWER GAS TURBINE ENGINE WITH AERODYNAMIC TORQUE CONVERTER DRIVE

This invention relates to gas turbine engines and particularly to the output drive of a gas turbine engine for providing work.

BACKGROUND OF THE INVENTION

In the United States patent to Charles C. Hill U.S. Pat. No. 3,314,232, there is disclosed and claimed a gas turbine engine coupled with an aerodynamic torque converter wherein compressible fluid from the compressor of the engine is utilized to vary the density of the fluid in the aerodynamic torque converter and thereby provide a variable drive without the use of high speed gearing.

Among the objects of the invention are to provide a gas turbine engine of the free power type which is selec-tively connected with an aerodynamic torque converter to provide selective and variable drive of the output shaft.

SUMMARY OF THE INVENTION

A gas turbine engine including a first turbine stage and a second turbine stage, the first turbine stage being connected directly to the compressor and the second turbine stage being unconnected thereto, combined with an aerodynamic torque converter. The aerodynamic torque converter has an input shaft connected to the second stage of the turbine and an output shaft which can be selectively connected to the second stage of the turbine to provide for drive thru the aerodynamic torque converter or through the turbine and bypassing the aerodynamic torque converter.

DESCRIPTION

Figure 1:
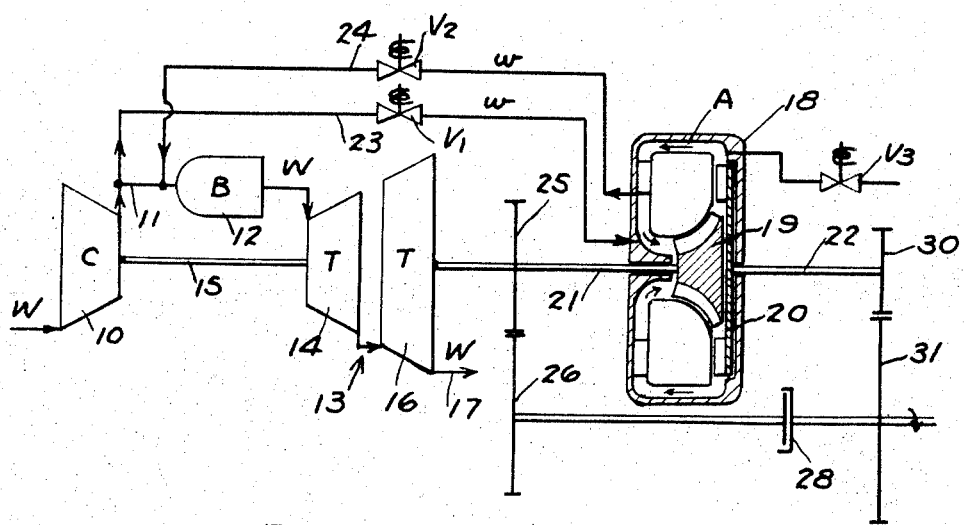
FIG. 1 is a schematic diagram of a gas turbine with aerodynamic torque drive embodying the invention.

Referring to FIG. 1, a portion of the output of a compressor 10 in the form of compressed air flows through a fluid line 11 to combustor 12 of gas turbine 13 which has a first stage 14 directly coupled to compressor 10 by a shaft 15 and a second stage 16 to which the exhaust gases of stage 14 are directed. The exhaust gases from the turbine 16 flow through line 17 to the atmosphere.

An aerodynamic torque converter 18 is provided and has a casing with an inspect rotor 19 and an output rotor 20 that is connected by a shaft 21 to the turbine stage 16. The casing is adapted to be filled with compressible fluid, namely, air, from the compressor 10 so that upon rotation of the rotor 19, the flow of air exerts a torque which is provided to rotate an output rotor 20 and, in turn, output shaft 22 of the aerodynamic torque converter. The flow of air being in the path of the arrows A. Output rotor 22 may be part of a single or multi stage turbine. Torque converter 18 is preferably of the outward radial flow turbine type. As shown in the drawing, torque converter 18 comprises a single stage of compression and expansion but the torque converter may have multiple stages of compression and/or expansion. Axial flow turbomachinery may also be used.

Compressible fluid in the form of compressed air may flow from the compressor 10 to the casing of the torque converter through a first fluid line 23. In order to control the density of the fluid in the casing and to provide for a steady through flow for cooling, a second fluid line 24 extends from the casing to the combustor line 11 at the inlet of the combustor 12.

Valves $V_1$, $V_2$ are provided in the lines 23, 24 to control the operation of the aerodynamic torque converter. In addition, valve $V_3$ is provided for controlling the evacuation of the aerodynamic torque converter in the case where the aerodynamic torque converter is not to be used for driving the output shaft. Valves $V_1$, $V_2$ can be controlled as set forth in the aforementioned United States patent to Hill U.S. Pat. No. 3,314,232 to vary the density of the fluid in the aerodynamic torque converter and thereby provide for variable drive without the use of high speed gearing. When the valves $V_1$, $V_2$ are closed and valve $V_3$ is opened, the casing 18 of the aerodynamic torque converter is evacuated and there will be no drive through the aerodynamic torque converter.

As shown, the turbine portion of the gas turbine engine comprises a first stage 14 which is directly coupled to the compressor 10 and a second stage 15 to which the gases from the first stage are fed. The second stage is coupled by a shaft 21 to the input rotor 19 of the aerodynamic torque converter 18. Provision is made by gears 25, 26, shaft 27, clutch 28, shaft 29 and gears 30, 31 to permit operation of the work shaft 32 either through the aerodynamic torque converter. or by bypassing the aerodynamic torque converter.

Further, in accordance with the invention, the operation of the aerodynamic torque converter 19 and clutch 28 are coordinated in order to obtain the highest efficiency. Thus, basically, the aerodynamic torque converter is utilized during start-up with the clutch 28 disengaged. As the speed of the output shaft increases, clutch 28 is engaged and the aerodynamic torque converter is evacuated or, in effect, disengaged.

Figure 2:
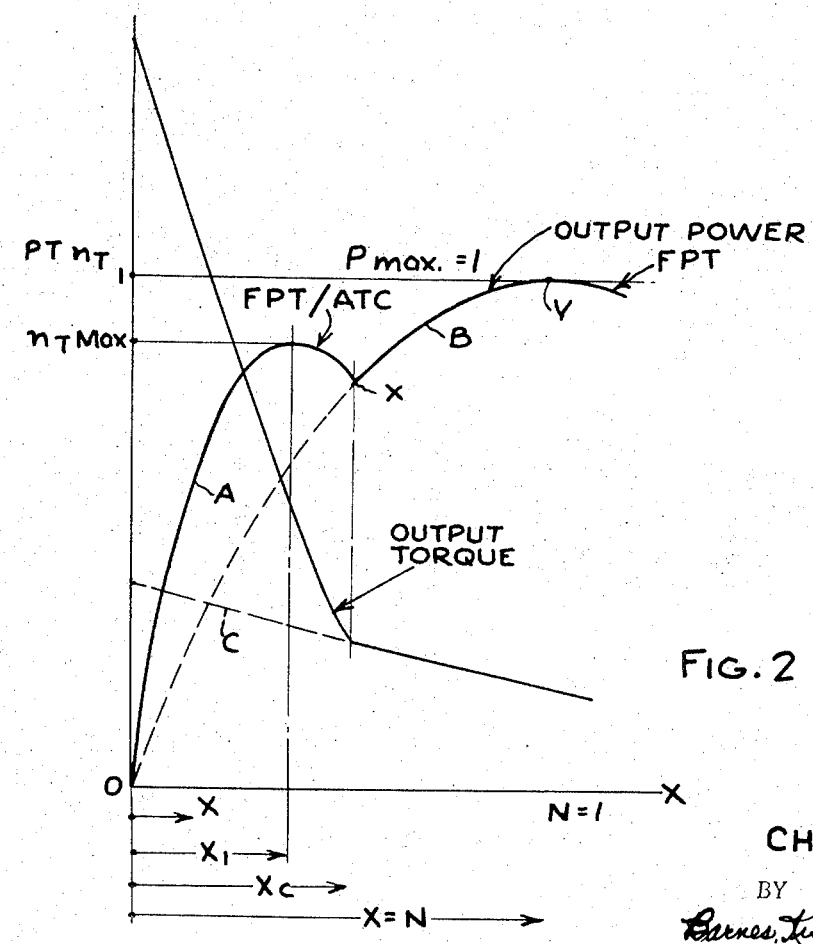
FIG. 2 is a curve of efficiency versus speed and torque versus speed.

The aforementioned relationship can be more readily understood by reference to FIG. 2 which is a curve of efficiency versus speed ratio. Curve A represents the curve when drive is through the free power turbine and the aerodynamic torque converter and Curve B represents the efficiency when drive is through the free power turbine with the aerodynamic torque converter is evacuated.

In the preferred operation, the aerodynamic torque converter is operated until point X is reached in the efficiency versus speed ratio curve. At that point clutch 28 is engaged and the aerodynamic torque converter evacuated so that the drive is entirely through the free power turbine and gearing. The free power turbine is then accelerated to point Y in order to maintain the maximum efficiency.

It can be seen by reference to FIG. 2 which also shows a curve of output torque versus speed ratio that by this arrangement, higher output torque during starting and reaching speed is achieved as contrasted to the broken line curve C which would be the case if only a free power turbine were used.

In accordance with the preferred method of operation of the apparatus shown in FIG. 1, it is contemplated that the valve $V_1$ would be momentarily opened a greater amount as the aerodynamic torque converter approaches X to thereby momentarily increase the density and lower the speed of the output shaft to the point X so that when the clutch 28 is engaged, there will be a minimum of friction and the drive through the clutch will be smooth. The aerodynamic torque converter can then be evacuated. This method of operation has the further advantage in that any inertia is fed to the load or output shaft rather than being lost in heat in the clutch. At the point of equal torque, the free power turbine is immediately accelerated to its maximum speed and output power is transmitted through the aerodynamic torque converter. This is achieved by declutching the clutch so that the entire drive is through the aerodynamic torque converter.

I claim:

1. The combination comprising
a gas turbine having a compressor, a combustor and a turbine,
and a torque converter,
said torque converter having a casing filled with a compressible fluid, an input rotor, and an output rotor which is driven by fluid action upon rotation of said input rotor,
said input rotor of said torque converter being connected to and driven by said rotor of said turbine,
an output shaft drive by said output rotor,
a first fluid line between the outlet of said compressor and the interior of said casing of said torque converter,
a second fluid line between the inlet to said combustor and said casing,
said turbine having a first stage coupled directly to the shaft of the compressor and a second stage which is not connected to the shaft of the compressor,
the output of the gases from the first stage being directed to the second stage,
said second stage being directly coupled to the input rotor of the torque converter,
and means selectivey coupling said second stage to the output shaft of the torque converter whereby the output of said gas turbine engine can be selectively directed to bypass the torque converter or to operate the output shaft of the torque converter through the torque converter.

2. The combination set forth in claim 1 including clutch means between the output shaft of the torque converter and the second stage of the turbine.

3. In an apparatus comprising a gas turbine having a compressor, a combustor and a turbine, and a torque converter, said torque converter having a casing filled with a compressible fluid, an input rotor, and an output rotor which is driven by fluid action upon rotation of said input rotor,
an output shaft driven by said output rotor,
said input rotor of said torque converter being connected to and driven by said rotor of said turbine,
a first fluid line between the outlet of said compressor and the interior of said casing of said torque converter,
a second fluid line between the inlet to said combustor and said casing,
said turbine having a first stage coupled directly to the shaft of the compressor and a second stage which is not connected to the shaft of the compressor,
the output of the gases from the first stage being directed to the second stage,
said second stage being directly coupled to the input rotor of the torque converter, the method which comprises initially operating the output shaft of the torque converter through the torque converter until the output speed reaches a predetermined value and thereafter operating the output shaft directly by bypassing the torque converter.

4. The method set forth in claim 3 including the step of momentarily increasing the density of fluid in the torque converter as the output reaches the predetermined speed.

* * * * *